United States Patent [19]

Dowling et al.

[11] Patent Number: 5,358,976
[45] Date of Patent: Oct. 25, 1994

[54] STABLE THIOL-ENE COMPOSITIONS

[75] Inventors: Joseph P. Dowling; Sarah C. Richardson; Killian Quigley, all of Dublin, Ireland

[73] Assignee: Loctite (Ireland) Limited, Dublin, Ireland

[21] Appl. No.: 996,837

[22] Filed: Dec. 23, 1992

Related U.S. Application Data

[63] Continuation of Ser. No. 612,759, Nov. 14, 1990, abandoned.

[51] Int. Cl.$^5$ ............ C08G 75/26; C08G 75/04; C08K 5/24
[52] U.S. Cl. .................................. 522/18; 522/14; 522/16; 522/17; 522/180; 526/180; 526/219; 528/361; 528/364; 528/376; 428/419
[58] Field of Search .............. 522/18, 180, 14, 16, 522/17, 18; 524/189

[56] References Cited

U.S. PATENT DOCUMENTS

| 4,230,740 | 10/1980 | Moyer | 427/54.1 |
| 4,808,638 | 2/1989 | Steinkraus | 522/167 |
| 4,985,471 | 1/1991 | Ohta | 522/27 |
| 5,034,156 | 7/1991 | Varwig | 252/403 |
| 5,167,882 | 12/1992 | Jacobine et al. | 528/128 |
| 5,208,281 | 5/1993 | Glaser | 524/189 |
| 5,262,569 | 11/1992 | Upmacis et al. | 564/112 |

FOREIGN PATENT DOCUMENTS 1528031 10/1978 United Kingdom ........... C08F 2/50

Primary Examiner—Marion E. McCamish
Assistant Examiner—Arthur H. Koeckert
Attorney, Agent, or Firm—Vidas, Arrett & Steinkraus

[57] ABSTRACT

Curable norbornene-thiol compositions are stabilized by addition of a non-acidic Nitroso compound.

8 Claims, No Drawings

STABLE THIOL-ENE COMPOSITIONS

This is a continuation of copending application(s) Ser. No. 0 7 /612, 759 filed on 11/14/90 now abandoned.

BACKGROUND OF THE INVENTION a) Field of the Invention

This invention relates to curable thiol-ene compositions based on bicyclic 'ene compounds having improved stability as compared to such compositions known heretofore.

b) Description of the Related Art

The synthesis of polythioethers by crosslinking polyenes with polythiols is a process which is well recognised in the art. The curing process is frequently one of photopolymerization initiated by actinic light, in particular light in the UV-visible range. Polymerization may also be effected by the use of high energy radiation and by exposure of the reactants to chemical free radical generating agents, usually thermally activated.

A particularly preferred group of thiol-ene compositions are those in which the 'ene is a bicyclic compound such as norbornene. Such compositions are described in U.S. Pat. No. 4, 808,638, the contents of which are incorporated herein by reference.

Thiol-norbornene compositions cure to polythioethers which have advantageous physical properties. However the thiol-norbornene compositions have poor stability characteristics in respect of both formulations designed to be photopolymerized and formulations designed to be thermally polymerized. In particular, the formulations have a short shelf-life and are prone to "set-up" even when stored in the dark and even when there is no photoinitiator in the formulation. Such premature curing therefore cannot be attributed to "stray light". The polymerization mechanism of polyene-polythiol systems is not fully understood. Consequently, the reason for formulation instability in the dark at ambient temperature is also unclear.

Some thiol-ene compositions are available which claim to have a shelf life of 4–6 months at room temperature. However a shelf life of 1 year at room temperature is desirable. In an effort to prolong the shelf-life of the known formulations it is recommended that the formulations be stored refrigerated. However, refrigeration of large quantities of polythiol-polyene formulations is costly and space-consuming.

Conventional stabilising additives have been included in norbornene-thiol (nene-thiol) compositions with little success. Table I below lists numerous materials which have been examined as stabilizers in organic nene-thiol systems and have been found to have little or no effect on the stability of the formulations.

TABLE I
MATERIALS HAVING LITTLE IF ANY BENIFICAL EFFECT ON THE STABILITY OF ORGANIC NENE-THIOL SYSTEMS

Phenol Based
Phenothiazine
Hydroquinone
3,6-Di-tert-butyl-4-methyl phenol (BHT)
4,4'-Methylene bis(2,4-Di-tert-butyl phenol)
Irganox 1010 (Ciba Geigy)
Irganox 1076 (Ciba Geigy)
Irganox MD-1024 (Ciba Geigy)
Vitamin E
1,4-Naphthoquinone
Pyragallol TABLE I-continued
MATERIALS HAVING LITTLE IF ANY BENIFICAL EFFECT ON THE STABILITY OF ORGANIC NENE-THIOL SYSTEMS p-Methoxy phenol
pH Modifiers
Acrylic Acid
Citraconic acid
Acetic acid
1-Hydroxyethylidene-1-diphosphonic acid (Dequest 2010)
Phosphorous acid
2-(Di-isopropylamino) ethanol
Sacrificial Mercaptans
Thiophenol
p-Hydroxy thiophenol
4-Bromo thiophenol
4-Methoxy benzenethiol
2-Mercapto benzothiazole
m-Trifluoromethylthiophenol
2-Mercapto benzoxazole
2-Nitrobenzyl mercaptan
Durene dithiol
Amine Based Stabilisers
2,4,6 Tris (dimethylaminomethyl) phenol
3-Dimethylaminophenol
N,N'-di-sec-butyl phenylene diamine
N-phenyl naphthylamine
Acetyl phenyl hydrazine
Tinuvin 770 (Ciba Geigy)
Tinuvin 1130 (Ciba Geigy)
Sacrificial Ene Monomers
N-Vinylpyrrolidone
n-butyl vinyl ether
N-Vinylcarbazole
N-Vinylcaprolactam
Florstab U.V.3 (Floridienne U.K. Ltd.)
Metal Chelators
Ethylene diamine tetraacetic acid, tetrasodium salt
N-(2-Hydroxyethyl) Ethylene diamine triacetic acid, trisodium salt
Phosphorous or Boron Based Stabilizers
Tributyl phosphine
Diphenyl phosphine
Triphenyl phosphine
Tribenzyl phosphine
Allyl diphenyl phosphine
Triallyl phosphine
Triethyl phosphite
Weston 600 (Spiro phosphite)
Hydroxy methyl bicyclic phosphite
Trinorborane boron
Triphenyl boron The organic nene-thiol compositions referred to above contain norbornenes and thiols having a structure based on carbon atoms optionally interrupted by one or more hetero atoms such as 0, S or N. It is also possible to make useful compositions in which both the norbornene and the thiol are based on siloxane backbones. Such compositions (hereafter called "inorganic nene-thiol compositions") have different stability characteristics from the organic nene-thiol compositions and may, for example, be stabilised satisfactorily by 3,6-di-tert.-butyl-4-methyl phenol (BHT).

The present invention is based upon the unpredictable discovery that non-acidic nitroso compounds are successful as stabilisers in both organic and inorganic norbornene-thiol compositions.

The use of nitroso compounds has also been described to inhibit polymerization in non-thiol containing systems. According to the Description of prior art in U.S. Pat. No. 4,168,982, Hungarian Patent Specification No. 150,550 (1963) describes the use of p-aminonitrosobenzene and alpha-nitroso-beta-naphthol as free radical polymerization inhibitors in styrene systems; U.S. Patent Specification No. 3,625,696 describes thermal polymerization inhibition by N-nitrosocyclohexylhydroxylamine salts; inhibition of styrene and vinyl acetate polymerizations by the use of 4-nitrosophenol, 1,4-dinitrosobenzene, nitrosoresorcinol, p-nitrosodimethylaniline and other nitroso compounds are described in Chimia (Aaray), 19, p.116 (1965), and Kinetics and Catalysis (USSR), 6, p.175-181 (1965); and U.S. Pat. No. 3,203,801 describes the use of N-substituted p-nitrosoanilines as sensitometric modifiers for photopolymerization systems.

Similarly U.S. Pat. No. 4,168,982 itself describes the use of nitroso dimers to selectively inhibit thermally-induced free radical polymerization. The nitroso dimers dissociate to form the active nitroso monomer which produces the stabilizing effect. In the photographic and printing industry, stabilizers which inhibit dark reactions (i.e. thermal polymerization) without inhibiting photopolymerization are known. Japanese Patent Application Nos. 88/170401 (Wade et al), 86/103150 (Fujikawa et al), 86/57271 (Ishii et al), 86/481 (Kuroda), 86/4578 (Kuroda), 79/31727 (Hosaka et al) and 74/59892 (Manamii et al), describe the use of N-nitrosophenylhydroxylamine derivatives as polymerisation inhibitors. In particular, the aluminium salt of N-nitrosophenylhydroxylamine has been described for use as a stabiliser in vinyl polymer compositions (88/170401), the production of photosensitive printing plates comprising polyvinylacetate and acrylates (86/103150), the production of embossed decorative materials using inks comprising PVC and trimethylolpropane trimethacrylate (86/57271), embossed sheets again using PVC sheets with a photosensitive resin coating (86/841, 86/4578), the production of photosensitive resin (79/31727) and in unsaturated polyester compositions (74/59892).

Japanese Patent Application No. 79/106307 describes nitrosophenylhydroxylamine salts, in particular, the aluminium salt of N-nitrosophenylhydroxylamine as polymerization inhibitors for photocurable printing inks comprising Epikote 828 and acrylic acid.

European Patent Application 0,289,852 A1 describes a radiation curable pressure sensitive adhesive composition comprising:

(A) 100 parts by weight of a hydrogenated polybutadiene applied oligomer which has one or more ethylenically unsaturated terminal radicals in its molecule and in which 70% or more of intramolecular carbon-carbon double bonds has been hydrogenated;

(B) from 0.2 to 20 parts by weight of a chain transfer agent; and (C) from 0.001 to 1.0 parts by weight of a thermal polymerization inhibitor selected from metal complexes of N-nitrosophenylhydroxylamine. Such a composition is said to have excellent storage stability and curing property. Among illustrative examples of chain transfer agents are mentioned thiols such as pentaerythritol tetrakis (β-thiopropionate). The preferred amount of the chain transfer agent is from 2 to 15 parts by weight per 100 parts by weight of the oligomer. If this amount exceeds 20 parts by weight, the curing is stated to be insufficient. If the amount of the thermal polymerization inhibitor exceeds 1.0 parts by weight, the radiation curing is stated to be inhibited. The preferred range is from 0.01 to 0.1 parts by weight.

European Patent Application 0,289,852 A1 is concerned with a pressure sensitive adhesive composition of a particular type, having a polybutadiene backbone. A relatively small proportion of a thiol is suggested as a chain transfer agent. However there is no teaching concerning thiol-ene compositions based on bicyclic 'ene compounds such as norbornene which are particularly unstable on storage or about compositions in which 'ene and thiol groups are in molar equivalence. In particular, it could not be predicted that nitroso compounds could be used as stabilisers in such compositions without adversely affecting curing performance.

In view of the wide range of stabilizers previously examined for use with norbornene-thiol compositions it could not be predicted that N-nitrophenylhydroxylamines would be of any utility.

SUMMARY OF THE INVENTION

According to the present invention there is provided polymerizable compositions comprising
i) a 'ene compound having a plurality of groups of the formula I:

where Q is $CR^1_2$, O, S, $NR^1$ or $SO_2$, $R^1$ (which may be the same or different) is H or alkyl, and m is 0-10;

ii) a compound having at least two pendant or terminally positioned —SH functional groups per average molecule; and iii) a stabilizing amount of a non-acidic Nitroso compound.

When $R^1$ is alkyl, the alkyl group preferably has 1-10 carbon atoms, more particularly 1-5 carbon atoms.

Preferably the unsaturated groups of the 'ene compound (i) are approximately in molar equivalence with the —SH functional groups in the thiol compound (ii) e.g. the mole ratio of reactive carbon-carbon unsaturated groups to thiol groups may vary from about 0.75/1 to about 1.5/1.

Preferably, the polymerizable composition further comprises an effective amount of a free radical initiator and/or a photocuring rate accelerator.

The present invention overcomes the thermal instability of the thiol-norbornene compositions of the prior art by providing curable thiol-norbornene compositions which are stable at ambient temperature over prolonged periods.

In a preferred embodiment of the present invention the polyene may be selected from compounds having a plurality of norbornene groups. Preferably the polyene has a plurality of groups of the formula II:

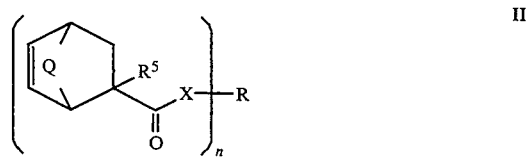

where Q is as defined above, $R^5$ is H or methyl, X is O, S or $NR^1$, n is an integer of 2 or more, and R is an n-valent radical, more particularly where Q is $CH_2$ or O, X is O and $R^5$ is H. In a preferred embodiment the polyene is of formula III

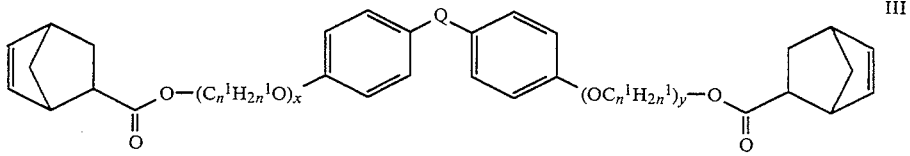

where Q is as defined above, $n^1$ is 1–6 and x and y are integers of 1 or more, more particularly where Q is $-C(CH_3)_2-$, $n^1$ is 1–3 and x and y are 1. Other norbornene compounds as described in U.S. Pat. No. 4,808,638 may also be used.

The usefulness of thiolene compositions based on the norbornenyl compounds of U.S. Pat. No. 4,808,638 has hitherto been limited because of the problem of finding a suitable stabiliser. This problem has now been overcome by the present invention.

While the present invention is described primarily in terms of norbornene compounds, other compounds within formula I, for instance where the divalent bridge group Q is $CHCH_3$; $C(CH_3)_2$; O, S, $NR^1$ or $SO_2$ may also be employed, as described in U.S. Pat. No. 4,808,638.

Polyenes suitable for use in the present invention typically have molecular weights in the range 30–20,000.

The polythiol components may be any of those known in the prior thiol-ene art. The most common polythiol compounds are described in U.S. Pat. No. 3,661,744. The desirable characteristics of a polythiol suitable for use in thiolene systems are a functionality greater than 2, a multiplicity of pendant or terminally positioned —SH functional groups per average molecule, a low-level of mercaptan-like odour and a molecular weight in the range of about 94 to 20,000. The polythiol components are also described in U.S. Pat. Nos. 3,898,349 and 4,008,341 which are incorporated herein by way of reference.

Examples of preferred relatively odourless polythiol compositions include poly-β-mercaptoacetate or poly-β-mercaptopropionate esters, in particular the pentaerythritol tetra esters or trimethylolpropane triesters are preferred. Specific examples include, but are not limited to, pentaerythritol tetrakis (β-mercaptopropionate), pentaerythritol tetrakis (thioglycolate), ethylene glycol bis (thioglycolate) and trimethylopropane tris (thioglycolate).

The non-acidic nitroso compound for use in the invention comprises a functional moiety of structure $-N=O$ The structure of the remainder of the Nitroso containing compound is not thought to be important provided it does not contain acidic groups such as phenol.

A wide range of nitroso compounds may be used in the thiolene compositions of the invention, as exemplified by the following non-limiting examples e.g. N-nitroso amines, N-nitroso amino acids and N-nitroso amides having the group—N—NO, including aliphatic amines such as N-nitrosodiethylamine, aromatic amines or amino acids or amides such as N-nitrosobenzylethylamines, N-nitroso-N-phenyl glycine, N-methyl-N-nitroso-p-toluene sulphonamide and 4-nitroso-N,N-dimethylaniline, complexes such as the aluminium and ammonium salts of N-nitroso-phenylhydroxylamine, dimers such as the tert-nitrosobutane dimer and alcohols such as 2-nitroso-1-naphthol; other examples of suitable nitroso compounds include nitrosobenzene, 2-methyl-2-nitrosopropane, 1-nitrosopyrrolidine and 5-nitroso-2,4,6-triaminopyrimidine.

N-nitroso hydroxylamine derivatives suitable for use in the thiolene compositions of the invention may be broadly defined by the formula $[RN(NO)O]_nR^2$ wherein R is an aliphatic, alicyclic or aromatic group preferably having 1 to 18 carbon atoms, optionally substituted with a halogen, hydroxyl or cyano group; $R^2$ is hydrogen, a group I to III metal, a group VIIIB metal or a substituted or unsubstituted $NH_4$ group; and n=1–5 corresponding to the positive charge number of $R^2$.

Particularly preferred nitroso compounds are the N-nitrosophenylhydroxylamine salts, more particularly the ammonium and aluminium salts. Of the two salts, the aluminium salt is preferred as it is not a known carcinogen and does not discolour the polythioether product.

The structure of the preferred aluminium salt is shown below

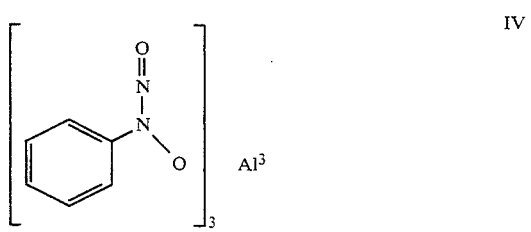

Other nitroso compounds which could be used in the compositions of this invention are the nitroso dimers, or monomers corresponding to the nitroso dimers, listed in U.S. Pat. No. 4,168,982 which is incorporated herein by way of reference.

The concentrations employed in the composition depend on the unsaturated compound/initiator system employed and the polythiol employed. The concentration is generally between about 0.001% and about 8% by weight based on the total composition, as concentrations greater than 8% may inhibit photopolymerization. The preferred concentration range is 0.007% to 2.0% by weight. The amounts of the nitroso compound used may be substantially in excess of the limit of 1.0 part by weight suggested in EP 0,289,852 A1.

Polymerization is usually initiated by a free-radical generating system which furnishes free radicals when activated by radiation. Preferably, the free-radical generating system absorbs radiation within the 200 to 800 nm range. Although the polyene component may generate a free radical when exposed to actinic radiation, cure initiators or accelerators are often included in the formulations in order to accelerate curing. The curing period required is determined by the source of radiation (e.g. sunlight, UV light source), nature and concentration of the photocuring rate accelerator or initiator, temperature, and the molecular weight and functionality of the polyene and polythiol. Examples of typical photo-curing rate accelerators or initiators are azobenzene, benzophenone, methyl ethyl ketone and carbon tetrachloride. The initiator or accelerator component is used in the amounts usually employed with conventional thiolone systems. Typically, the cure initiating component is present in the range 0.05 to 8%, more typically 0.5% to 5% by weight of the composition.

The photocuring rate accelerator may be present as a separate component in the composition, (e.g. azobenzene), as a mixture of two or more separate components (e.g. benzophenone; carbon tetrachloride and phenanthrene and the like), or chemically combined with the polyene component. Alternatively, the photocuring rate accelerator may be formed in situ.

Similarly, the polyene and polythiol may be formed in situ in the photocurable composition, without departing from the scope of the invention.

The compositions of the invention may also include, as required, ingredients such as antioxidants, dyes, activators, another prepolymer or polymer, solvent, filler, diluent, pigment, thixotropic agent, surface active agents and the like.

The compositions of the invention are found to be stable for long periods at ambient temperature. Compositions of the invention have been found to be stable at ambient temperature after seven months whereas existing compositions cure somewhat after two days.

The mechanism by which addition of the nitroso compound prevents premature polymerization of the compositions when stored at ambient temperature while excluding light is not fully understood. It would appear that the thermal and photostability of the compositions are inter-related and that the nitroso compounds increase the overall stability of multifunctional thiolene formulations.

DESCRIPTION OF THE PREFERRED EMBODIMENTS

The invention is illustrated by the following non-limiting Examples in which the following abbreviations are used and in which all parts are parts by weight:

U.V.4 Stabiliser available from Floridienne (U.K.) Ltd. Watford, England, which, following analysis, has been found to comprise the aluminium salt of N-nitrosophenylhydroxylamine at approximately 0.9%, a plasticiser at approximately 70%, a polymerization accelerator at approximately 25% and a dispersant or coating modifier at approximately 54%.

Q1301 Aluminium salt of N-nitrosophenylhydroxylamine, available from Wako Chemicals GmbH, 4040 Neuss, Federal Republic of Germany.

EBANC (Ethoxylated Bis-phenol A)-Bis-(5-Norbornene-2-carboxylate).

Q43 Pentaerythritol tetra-3-mercaptopropionate.

Irgacure—Ciba Geigy photoinitiators
 184 1-Benzoylcyclohexanol
 651 2,2-Dimethoxy-2-phenylacetophenone.

Stability tests are generally conducted at elevated temperature e.g. 82° C. in order to complete the tests in a reasonable time period. The extrapolation of such test results to stability at ambient temperature is well recognised by those skilled in the art.

EXAMPLE 1

Demonstration of increasing stability of a nene-thiol formulation with increasing concentrations of Q-1301

| Stock Solution | Parts by Weight | | | | | | | | | | | | | | | |
|---|---|---|---|---|---|---|---|---|---|---|---|---|---|---|---|---|
| Q43 | 2777 | | | | | | | | | | | | | | | |
| EBANC | 7026 | | | | | | | | | | | | | | | |
| Irgacure 651 | 196 | | | | | | | | | | | | | | | |
| | 1 | 2 | 3 | 4 | 5 | 6 | 7 | 8 | 9 | 10 | 11 | 12 | 13 | 14 | 15 | |
| Stock Solution | 100 | 100 | 100 | 100 | 100 | 100 | 100 | 100 | 100 | 100 | 100 | 100 | 100 | 100 | 100 | 100 |
| Q-1301 | 0 | 0.001 | 0.0025 | 0.004 | 0.0055 | 0.007 | 0.0085 | 0.0115 | 0.013 | 0.025 | 0.5 | 1.0 | 2.0 | 3.0 | 5.0 | 8.0 |
| 82° C. Stability (hours) | 1 | 24–40 | 72 | 72 | 72 | 96 | 96–112 | 112 | 112 | 136 | 162 | 162 | 162 | 162 | 162 | 170 |

8% Q-1301 represents the limit of solubility.

EXAMPLE 2

Demonstration of instability in the absence of a Photoinitiator, and the stabilising effect of Q-1301

| Stock Solution | Parts by Weight | | | | | | | |
|---|---|---|---|---|---|---|---|---|
| A43 | 305 | | | | | | | |
| EBANC | 772.5 | | | | | | | |
| | 1 | 2 | 3 | 4 | 5 | 6 | 7 | 8 |
| Stock Solution | 100 | 100 | 100 | 100 | 100 | 100 | 100 | 100 |
| UV4 | 0 | 0.02 | 0.1 | 0.25 | 0.5 | 1.0 | 1.5 | 2.0 |
| 82° C. Stability (hours) | 1 | 25 | 65 | 120 | 130 | 144 | 144 | 120 |

EXAMPLE 3

Comparison of the stabilities of formulations in the presence and absence of a nitroso compound at a range of temperatures

| | FORMULATION 3.1 Parts by Weight | FORMULATION 3.2 Parts by Weight |
|---|---|---|
| EBANC | 71.66 | 71.66 |
| Q43 | 28.33 | 28.33 |
| Irgacure184 | 2.00 | 2.00 |
| UV4 | 0.00 | 2.00 |
| Stability at 82° C. | 30 minutes | 168 hours |
| Stability at 55° C. | 17 hours | 59 days |
| Stability at 40° C. | 144 hours | 7 months |
| Stability at R.T. (ambient) | 9 days | 9 months |

EXAMPLE 4

Demonstration of the increase in stability with alternative thiols.

|  | FORMULATION 4.1 Parts by Weight | FORMULATION 4.2 Parts by Weight |
|---|---|---|
| EBANC | 72.17 | 72.17 |
| Glycoldimercaptoacetate | 27.82 | 27.82 |
| Irgacure 651 | 2.00 | 2.00 |
| UV4 | 0.0 | 0.5 |
| Stability at | 1 day | 5 months |

Ambient Temperature

|  | FORMULATION 4.3 Parts by Weight | FORMULATION 4.4 Parts by Weight |
|---|---|---|
| EBANC | 77.25 | 77.25 |
| Trimethylolethane tri-(3-mercaptoproprionate) | 32.00 | 32.00 |
| Irgacure 651 | 1.96 | 1.96 |
| UV4 | 0.0 | 1.0 |
| 82° C. stability | 5 hours | 8 days |

EXAMPLE 5

Stability increases with alternative nitroso compounds

A

| Stock Solution A: | Parts by Weight |
|---|---|
| EBANC | 25.7 |
| Q43 | 10.3 |
| Irgacure 651 | 1.0 |
| Reagent | 0.2 |

| Reagent | 82° C. Stability |
|---|---|
| 4-Nitrosophenol | 2–15 hours (Comparative Example) |
| N-Nitrosodiethylamine | 6 days |
| Nitrosobenzene | 7 days |
| N-Nitrosobenzylmethylamine | 5 days |
| N-Nitroso-N-phenyl glycine | 4 days |
| 2-Methyl-2-nitrosopropane | 3 days |

B

| Stock Solution B Prepared | Parts by Weight |
|---|---|
| EBANC | 257 |
| Q43 | 103 |
| Irgacure | 3 |

| Composition Examined | Parts by Weight |
|---|---|
| Stock Solution B | 25 |
| Reagent | 0.2 |

| Reagent | 82° C. Stability |
|---|---|

-continued

| | |
|---|---|
| Q1300 (Ammonium salt of N-Nitrosophenylhydroxylamine) | 6 days |
| 1-Nitrosopyrrolidine | 12 days |
| tert-Nitrosobutane dimer | 28 hours |
| 5-Nitroso-2,4,6-triamino-pyrimidine | 28 hours |
| 2-Nitroso-1-Naphthol | 5 days |
| N-methyl-N-nitroso-p-toluene sulphonamide | 6 days |
| 4-Nitroso-N,N-dimethylaniline | 5 days |

EXAMPLE 6

| Formulations (Parts by Weight) | 2 | 5 | 7 | 9 | 11 | 12 | 13 | 14 | 15 |
|---|---|---|---|---|---|---|---|---|---|
| Q43 | 27.77 | 27.77 | 27.77 | 27.77 | 27.77 | 27.77 | 27.77 | 27.77 | 27.77 |
| EBANC | 70.26 | 70.26 | 70.26 | 70.26 | 70.26 | 70.26 | 70.26 | 70.26 | 70.26 |
| Irgacure 651 | 1.96 | 1.96 | 1.96 | 1.96 | 1.96 | 1.96 | 1.96 | 1.96 | 1.96 |
| Q1301 | 0.0025 | 0.007 | 0.0155 | 0.25 | 1.0 | 2.0 | 3.0 | 5.0 | 8.0 |
| Results |  |  |  |  |  |  |  |  |  |
| F.T. | 2 | 2 | 2 | 2 | 2 | 10 | 12 | 20 |  |
| T.F.T. | 5 | 5 | 5 | 5 | 5 | 10 | 15 | 15 | 20 |

F.T. Fixture Time
Time in seconds for two glass slides, between which is applied one drop of the formulation, to bond to hand strength when exposed to U.V. light at an intensity of 5 mW/cm$^2$ (365 nm).
T.F.T.
Time in seconds for the surface of the formulation to become non-tacky when exposed to U.V. light at an intensity of 5 mW/cm$^2$ (365 nm).
While the performance is somewhat reduced at higher loadings of Q1301, they are still acceptable.

EXAMPLE 7

Addition of hydroquinone as a co-stabiliser with U.V. 4 in nene-thiols.

| Formulations (Parts by Weight) | 7.1 | 7.2 |
|---|---|---|
| Q43 | 27.77 | 27.77 |
| EBANC | 70.26 | 70.26 |
| Irgacure 651 | 2.00 | 2.00 |
| U.V. 4 | 1.00 | 1.02 |
| Hydroquinone |  | 0.02 |
| Initial Viscosity | 6720 mPas | 7400 mPas |
| Viscosity after 4 weeks room temperature | 6520 mPas | 11120 mPas |

Viscosity measurements were carried out with a Brookfield RVT viscometer, spindle 4, at 20 rpm at 25° C.

EXAMPLE 8

| Stabilisation of Norborene Siloxanes | | |
|---|---|---|
| Formulation | 8.1 | 8.2 |
| PFS 28N | 91.59 | 91.59 |
| 3K5M | 6.41 | 6.41 |
| Darocure 1116 | 2.00 | 2.00 |
| U.V. 4 | 0.00 | 0.50 |

Viscosity measurements were carried out with a Brookfield RVT Viscometer, spindle 5, 20 rpm, at 25° C.

| Initial Viscosity | 2600 mPas | 2600 mPas |
|---|---|---|
| Viscosity after 3 days at 55° C. | 3400 mPas | 2600 mPas |
| Viscosity after 3 months at room temperature | 6600 mPas | 2800 mPas |

Abbreviations

Abbreviations
PFS 28N: Norbornene capped siloxane

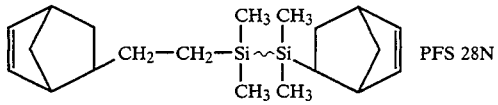

prepared by norbornene capping of

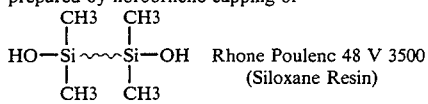 Rhone Poulenc 48 V 3500
(Siloxane Resin)

3K5M Siloxane thiol crosslinker (3000 molecular weight)

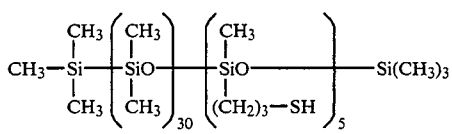

Darocure 1116 Photoinitiator (E. Merck)

EXAMPLE 9

Silicone Formulation Stabilities

| Formulation | |
| --- | --- |
| PFS 28N | 175 grams |
| 3K5M | 10.68 grams |
| 2% DEAP | 3.79 grams |
| Stabiliser | 0.09 grams |

The formulation was stored in the dark in air at room temperature.

Viscosities were measured with a Brookfield RVT viscometer at 20 rpm using spindle 4 at 25° C.

| | Control (Uninhibited) (mPas (% change)) | BHT 500 ppm (0.09 g) (mPas (% change)) | Q-1301 500 ppm (0.09 g) (mPas (% change)) |
| --- | --- | --- | --- |
| Viscosity - initial | 2870 | 2880 | 2900 |
| - 28 days | 3060 (+6.6) | 2900 (+0.7) | 2950 (+1.7) |
| - 42 days | 3180 (+10.8) | 2920 (+1.4) | 2980 (+2.8) |
| - 77 days | 3420 (+19.2) | 2850 (0) | 2960 (+2.1) |
| - 116 days | 3880 (+35.2) | 2930 (+1.7) | 3060 (+5.5) |
| - 150 days | 4080 (+42.2) | 2820 (−2.1) | 3020 (+4.1) |

Abbreviations
PFS 28N and 3K5M as in Example 9.
DEAP 2,2-Diethoxy acetophenone.

We claim:

1. A composition polymerizable to a crosslinked polythioether comprising
   i) an 'ene compound having a plurality of groups of the formula

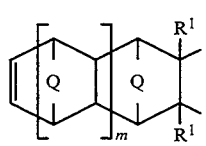

where Q is $CR^1_2$, O, S, $NR^1$ or $S_2$, each $R^1$ is independently H or alkyl, and m is 0–10;
   ii) a compound having at least two pendant or terminally positioned —SH functional groups per average molecule, the ratio of reactive carbon-carbon unsaturated groups in the 'ene compound (i) to —SH functional groups on the thiol compound (ii) being in the range from about 0.75/1 to about 1.5/1;
   iii) a stabilizing amount of a non-acidic nitroso compound selected from the group consisting of N-nitroso amines, N-nitroso amino acids, N-nitroso amides, N-nitroso hydroxylamine salts, nitrosobenzene, 4-nitroso-N,N-dimethylaniline, 1-nitrosopyrrolidine and 2-methyl-2-nitrosopropane; and
   iv) a phenyl ketone photoinitiator.

2. A composition according to claim 1, wherein the nitroso compound is an N-nitroso amine, an N-nitroso hydroxylamine salt, an N-nitroso amino acid or an N-nitroso amide.

3. A composition according to claim 2 wherein the nitroso compound is a hydroxylamine derivative of the formula $$[RN(NO)O]_n R^2$$

wherein
R is an aliphatic, alicyclic or aromatic group, optionally substituted with a halogen, hydroxyl or cyano group; $R^2$ is hydrogen, a group I to III metal, a group VIIIB metal or substituted or unsubstituted $NH_4$ group; and n = 1–5 corresponding to the positive charge number of $R^2$.

4. A composition according to claim 3 wherein the nitroso compound is the aluminum or ammonium salt of N-nitrosophenylhydroxylamine.

5. A composition according to claim 1 wherein the 'ene compound (i) has the groups of formula I attached to a backbone of carbon-carbon atom structure, the backbone optionally interrupted by one or more hetero atoms.

6. A composition according to claim 1 wherein the compound (ii) having the —SH functional groups is an organic poly-β-mercaptoacetate or poly-β-mercaptopropionate ester.

7. A method of stabilizing a composition polymerizable to a crosslinked polythioether, the composition comprising
   (i) an 'ene compound having a plurality of groups of the formula

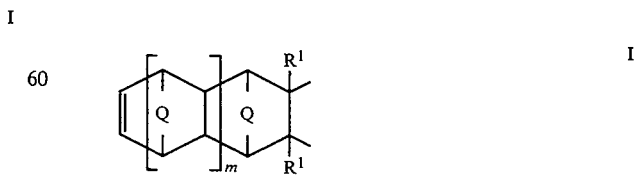

where Q is $CR^1_2$, O, S, $NR^1$ or $SO_2$, each $R^1$ is independently H or alkyl, and m is 0–10, and
   (ii) a compound having at least two pendant or terminally positioned —SH functional groups per average molecule, the ratio of reactive carbon-carbon unsaturated groups in the 'ene compound (i) to —SH functional groups in the thiol compound (ii) being the range from about 0.75/1 to about 1.5/1; and iii) a phenyl ketone photoinitiator;

the method comprising adding thereto a stabilizing amount of a non-acidic nitroso compound selected from the group consisting of N-nitroso amines, N-nitroso amino acids, N-nitroso amides, N-nitroso hydroxylamine salts, nitrosobenzene, 4-nitroso-N,N-dimethylaniline, 1-nitrosopyrrolidine and 2-methyl-2-nitrosopropane.

8. A composition polymerizable to a crosslinked polythioether comprising i) an 'ene compound having a plurality of groups of the formula

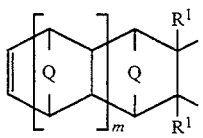

I where Q is $CR^1_2$, O, S, $NR^1$ or $SO_2$, each $R^1$ is independently H or alkyl, and m is 0–10;

ii) a compound having at least two pendant or terminally positioned —SH functional groups per average molecule, the ratio of reactive carbon-carbon unsaturated groups in the 'ene compound (i) to —SH functional groups in the thiol compound (ii) being in the range from about 0.75/1 to about 1.5/1;

iii) a stabilizing amount of a nitroso compound;

iv) a phenyl ketone photoinitiator;

wherein the nitroso compound is selected from the group consisting of N-nitrosodiethylamine, nitrosobenzene, N-nitrosobenzylmethylamine, N-nitroso-N-phenyl glycine, 2-methyl-2-nitrosopropane, 1-nitrosopyrrolidine, 2-nitroso-1-napthol, N-methyl-N-nitroso-p-toluene sulphonamide, and 4-nitroso-N,N-dimethylaniline.

* * * * *